Patented Jan. 8, 1929.

1,697,885

UNITED STATES PATENT OFFICE.

FRITZ SEEBACH, OF ERKNER, NEAR BERLIN, GERMANY, ASSIGNOR TO BAKELITE GESELLSCHAFT MIT BESCHRÄNKTER HAFTUNG, OF BERLIN, GERMANY.

PROCESS FOR PURIFYING PHENOLFORMALDEHYDE RESINS.

No Drawing. Application filed February 12, 1926, Serial No. 87,979, and in Germany March 6, 1925.

The present process for purifying phenolaldehyde condensation resins, especially phenolformaldehyde condensation resins, has the object of removing the uncombined phenols or the by-products contained in the said resins. The by-products are substances of strong smell, transformed into coloured products by the action of air and light and, in the presence of alkalies, are soluble in water. The chemical constitution of the said substances is not yet known. My process consists in treating the said resins with metal compounds other than alkalies able to form water soluble combinations with the uncombined phenols and the by-products, and with sufficient quantity of water to form a colloidal solution of the resin. From the colloidal solutions the resin is precipitated by adding water. The present process may be employed for all phenolaldehyde resins, phenol-furfural, phenolacetaldehyde, phenolbenzaldehyde, phenolbutyraldehyde, phenolformaldehyde resins in the fusible, soluble stage.

Suitable metal compounds are generally the oxides or hydroxides of the metals, able to form with phenols and by-products, water soluble salts or addition-compounds. The oxides or hydroxides may have basic, acid or amphoteric character and may be used single or mixed with each other. Suitable oxides or hydroxides are for instance the oxides or hydroxides of calcium, barium, strontium, magnesium, aluminium, copper, zinc, nickel. The process can be carried out with or without addition of organic solvents of the resins and the salts or compounds formed with the phenols and by-products can be easily removed from the resins by washing with water.

The metal oxides or hydroxides may be employed in admixture or combination with alkalies, for instance sodiumaluminate, potassium zincate, sodium zincate may be used.

In the place of the metal oxides or hydroxides, their molecular compounds may be used, from which the metal oxides or hydroxides are liberated during their action on the resins. Suitable compounds are for instance compounds of metal oxides or hydroxides and sugars or alcohols or ammonia or amines. The presence of the other compounds assists or accelerates the action of the metal oxides or hydroxides, perhaps catalytically.

The molecular or chemical compounds of metal-hydroxides, or oxides with alkalies, ammonia or organic bases as for instance pyridine may be formed during the formation of the suspension of the resin in water. For instance alkalies or organic bases may be added during the formation of the suspension or the addition of the oxides or hydroxides of the metals and of ammonia or of organic bases may be carried out separately.

In the present process the oxides or hydroxides or their molecular combinations are caused to act on the phenolaldehyde condensation products. As the oxides or hydroxides do not combine with the resin, but react only with the uncombined phenols or by-products, and form with them products soluble in water, there is no danger of employing too much of the said oxides or hydroxides. Inasmuch as the oxides or hydroxides of the metals react also with the resinous condensation products, smaller quantities only sufficient for combining with the free phenols or the by-products will be used, thereby taking in consideration that the phenols or the by-products do not only form chemical compounds (salts) with the metal oxides or hydroxides, but also molecular compounds, as for instance $Ca(OH)_2.2C_6H_5OH$.

The metal oxides or hydroxides which have not entered into reaction or combination with the phenols or the by-products may be separated from the resinous condensation products by filtration or centrifuging, but they may also be allowed to remain in the subsequently precipitated resinous condensation products as filling bodies.

Before, during or after the action of the metal oxides or hydroxides organic solvents of the resinous condensation products may be added, as for instance, ethylalcohol, methylalcohol, acetone, mixtures of them, even solvents immiscible or partly miscible with water, as for instance ether; halogenated hydrocarbons or mixtures of them with the other solvens.

After the formation of the metal salts of the phenols and by-products the resinous condensation products can be precipitated from their colloidal solutions by means of water. The precipitation of the resins by means of water may be carried out in the presence of so-called hydrotropic substances. The hydrotropic substances increase the solubility of the said metal salts of the phenols and by-products but do not affect the solubility of the resins. They thereby facilitate the complete separation of the impurities from the resins. Such substances are for instance sodium salicylate, the salts of the higher fatty acids, as for instance soaps, alkaline or ammoniacal soaps of the fatty acids, resin acids, waxy acids, sulfonated, halogenated fatty acids or oxy-fatty acids, or mixtures of the various soaps. (See Neuberg, Biochemische, Zeitschrift, volume 76, page 107 and Sitzungsberichte der preussischen Akademie der Wissenschaften 1916, page 1034.)

The action of the metal oxides or hydroxides on the resinous condensation products and the precipitation of the resinous condensation products from their colloidal solutions may be carried out in the presence of filling substances as mica, asbestos, infusoria earth, wood meal, cork, cotton, wool, silk, waste, which substances facilitate and accelerate the purification and division of the resinous condensation products and give an intimate mixture with the resinous condensation products. The filling bodies may be added at once or gradually before or during the process of purification.

*Example 1.*—100 kilograms or resinous phenol formaldehyde condensation product in small pieces are mixed with 200 litres of limewater (containing 6 kilograms of quicklime) 2-3 hours in a ball mill or an agitator. Thereby the resins are converted into a colloidal solution, and afterwards are precipitated from this solution. As soon as the resinous condensation product is transformed into a fine powder it is separated from the liquid, for instance by filtration or decantation and the resin is washed with water. From the washing water the extracted or dissolved substances can be precipitated by means of acids, as hydrochlorid acid, and the liberated phenols may be used again for the preparation of the condensation products. The resin may be dried at 30-40 degrees centigrade.

*Example 2.*—100 kilograms of resinous phenolformaldehyde condensation product as described in Example 1 are treated with 100 litres of water and 8 kilograms of magnesium-oxide in a ball mill until the mass is transferred into a powder. The mixture is centrifuged and the solid again treated with 100 litres of water and 5 kilograms of magnesium oxide in the ball mill. After centrifuging and drying the purified resin it is a bright coloured powder.

*Example 3.*—100 kilograms of resinous phenolaldyhyde-condensation product are treated in a ball mill with 5 kilograms of commercial sodium aluminate. The further proceeding is carried out as described in Example 1.

*Example 4.*—100 kilograms of resinous phenolformaldehyde condensation product are treated with 80 litres of water and 50 litres of a solution obtained from 5 kilograms of zinc chloride and ammonia in a ball mill by agitating quickly until a fine powder is formed. After washing the resin is centrifuged and dried.

*Example 5.*—100 kilograms of resinous phenolformaldehyde condensation product are treated with an ammoniacal solution of 4 kilograms of copper sulphate in 100 ltr. of water. The proceeding is carried out as described in Example 4.

*Example 6.*—100 kilograms of resinous phenolaldehyde condensation product are treated in a ball mill with 150 litres of water and 5-6 kilograms of the crystalline compound of 2 parts by weight of glycerine and 1 part by weight of calcium oxide. The resin is a colourless powder.

*Example 7.*—100 kilograms of resinous phenolaldyhyde condensation product are treated in a ball mill or by agitating quickly with 5 kilograms of calcium saccharate. After being transformed into a fine powder the resin is centrifuged and dried.

*Example 8.*—100 kilograms of resinous phenolaldehyde condensation product are treated in a ball mill with 180 litres of water and 6 kilograms of powdered quicklime, whereby a very fine powder is formed which generally is too fine for allowing a separation from the liquid by centrifuging or filtering. The mass is mixed with 1-1.5 kilograms of aluminium naphthionate (the aluminium salt of the 1 aminonaphthaline-4-sulpho-acid) in solid form in order to cause an enlargement of the particles. Then the powder is suitable for centrifuging and washing.

*Example 9.*—100 kilograms of resinous phenolaldehyde condensation product are ground by suitable means with 15 kilograms of dry quicklime. 150 litres of water are added thereupon and the mixture allowed to stand for about 1-2 hours. Then the mixture is centrifuged and dried. Before the drying the uncombined calcium oxide may be removed from the resin by adding diluted hydrochloric acid until the neutral reaction is obtained.

*Example 10.*—100 kilograms of resinous condensation product phenolformaldehyde are ground in a ball mill with 7 kilograms of calcium sulphide and 150 litres of water. Then the mixture is centrifuged and dried.

The preparation of the resinous phenolaldehyde condensation product may be effected by condensing an aldehyde as formaldehyde, acetaldehyde or their polymers with a phenol, as pure phenol, technical phenol, cresol (orthometa or para) or technical cresols, naphtols, preferably by means of condensing agents (bases, acids, salts) and evaporating the product. Before purifying the resins they generally contain 5-15% of free phenols and by-products.

I claim:—

1. The process for purifying fusible soluble resinous phenolaldehyde condensation products which consists in combining the uncombined phenols and by-products with such metal compounds higher than the alkali metals which form soluble compounds with the phenols and by-products, forming by mixing thoroughly a colloidal solution and precipitating the resins by means of water.

2. The process for purifying fusible soluble phenolaldehyde condensation products which consists in combining the uncombined phenols and by-products with such metal compounds higher than the alkali metals which form soluble salts with the phenols and by-products, and precipitating the resins by means of water and so-called hydrotropic substances which increase the solubility of the said salts in water.

3. The process for purifying fusible, soluble phenolaldehyde condensation products which consists in combining the uncombined phenols and by-products with a mixture of compounds of alkali metals and such metal compounds higher than alkali metals which form in the presence of alkaline compounds soluble compounds with the phenols and by-products, forming the resin by mixing thoroughly a colloidal solution and precipitating the resin by means of water.

In testimony whereof I hereunto affix my signature.

FRITZ SEEBACH.